United States Patent

Biró

[11] 4,410,037
[45] Oct. 18, 1983

[54] RECUPERATOR

[75] Inventor: Attila Biró, Budapest, Hungary

[73] Assignee: Kohaszati Gyárépíto Vállalat, Budapest, Hungary

[21] Appl. No.: 261,652

[22] Filed: May 7, 1981

[30] Foreign Application Priority Data

May 13, 1980 [HU] Hungary .................................... 1179

[51] Int. Cl.³ ............................ F28D 7/12; F24B 7/00
[52] U.S. Cl. ............................... 165/142; 165/DIG. 2; 237/55
[58] Field of Search ................ 165/DIG. 2, 142, 154; 237/55; 122/20 B; 126/110 AA

[56] References Cited

U.S. PATENT DOCUMENTS

| 1,500,838 | 7/1924 | Miller | 237/55 |
| 1,953,302 | 4/1934 | Johnston | 237/55 |
| 2,274,341 | 2/1942 | Mueller | 237/55 |
| 2,524,843 | 10/1950 | Slifer et al. | 237/55 |
| 2,634,720 | 4/1953 | Thulman | 237/55 |
| 3,029,803 | 4/1962 | Breese | 126/110 AA |
| 3,403,726 | 10/1968 | Jones | 165/142 |
| 3,907,026 | 9/1975 | Mangus | 165/142 |
| 3,913,663 | 10/1975 | Gates | 237/55 |
| 3,924,675 | 12/1975 | Essebaggers | 165/142 |
| 4,048,982 | 9/1977 | Pei | 165/142 |
| 4,079,885 | 3/1978 | Decker | 237/55 |
| 4,140,176 | 2/1979 | Essebaggers | 165/142 |
| 4,206,875 | 6/1980 | Grasso | 237/55 |
| 4,222,824 | 9/1980 | Flockenhaus | 165/142 |
| 4,269,266 | 5/1981 | Coates | 165/142 |
| 4,325,353 | 4/1982 | Husa | 237/55 |
| 4,325,509 | 4/1982 | Base | 237/55 |

Primary Examiner—Daniel J. O'Connor

[57] ABSTRACT

The invention relates to recuperators used mainly with industrial furnaces, which is provided with a radiation heat exchanger and a convective heat exchanger arranged one behind the other. These known types of recuperators are usable to exploit the waste heat of flue gases only with very low efficiency and have a voluminous and complicated structure.

The improvement of my invention is in that the convective heat exchanger has a central heat exchange part and at least one conduit for blowing air on the bottom surface of the central heat exchanger part.

The recuperator according to this invention has a longer endurance, a much higher effectiveness and a more simpler, smaller construction.

2 Claims, 1 Drawing Figure

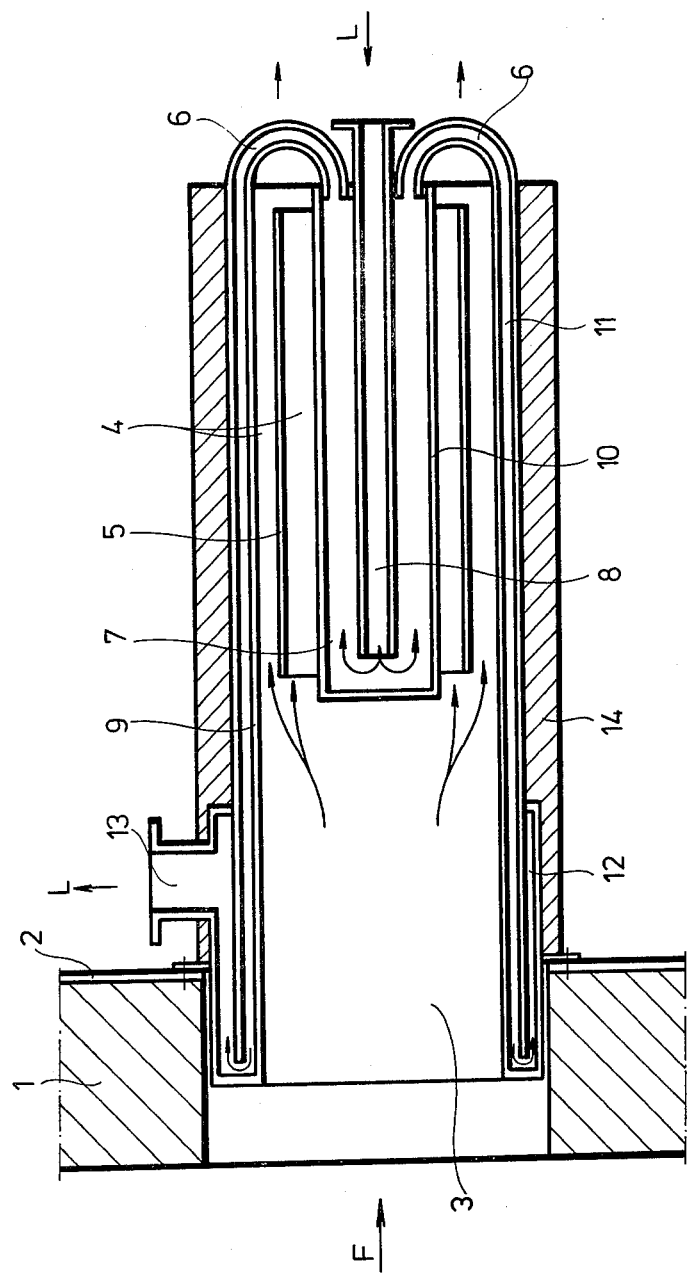

RECUPERATOR

The invention relates to recuperators provided with a radiation heat exchanger and a convective heat exchanger arranged one behind the other.

The recuperators of this type are mainly used with industrial furnaces, the waste heat of its emergent flue gas being exploited with the recuperator, e.g. for preheating the ingressing air for combustion or furnace air.

One type of these recuperators is provided either with radiation heat exchangers or with convective heat exchangers. Such types of recuperators are disclosed in a Russian book of B. L. Tebenkow ("Recuperatory dla promishlennih petshey", Moscow, 1969), namely the convective type in FIGS. 44 and 95, and the radiation type in FIG. 121. The common disadvantage of these recuperators is in that the waste heat of the flue gases can be exploited only with a little efficiency. Namely, if the flue gas is cooler than 1000 K, the heat radiation is very low. Thus, in the radiation heat exchanger a very small amount of heat will be exploited. But in the case of the convective heat exchanger, the thickness of the gas layer is too small, even if the flue gas is hotter than 1000 K. Thus, the convection will have a very little efficiency here, too.

The other type of the known recuperators is provided with radiation heat exchangers and convective heat exchangers arranged one behind the other. Such recuperators are shown in the above said Russian book, especially in FIGS. 139 and 140. These recuperators have the ability for waste heat exploitation from flue gases with great effectiveness, but in their convective heat exchanger the heat-transfer coefficient is small, followingly so that they have a construction occupying a great volume of space and they can be mounted on the furnace only with difficulties.

The main object of this invention is to eliminate the aforesaid deficiencies of the known solutions and to provide a recuperator, especially for industrial furnaces, with which the waste heat of the flue gases can be exploited with a greater efficiency, and which has a smaller, simpler construction easily applicable for furnaces.

The basic idea of my invention is in that the temperature of the flue gas should be reduced under 1000 K in a radiation heat exchanger and after this, the remaining heat should be exploited by impacting the flue gas to the central heat exchange part, and that the heat exchange on the heating side should be performed with impacting flows.

The improvement, i.e. the invention itself is in that the convective heat exchanger of the known type of recuperators has a central heat exchange part and at least one conduit blowing air on the bottom of the central heat exchange part.

Other details and objects of my invention will be described hereinafter with reference to the accompanying drawing, wherein a cross section of an exemplified embodiment of my invention is schematically shown.

In the Figure, the exemplified embodiment of the recuperator according to my invention is attached to an outer surface 2 of a furnace 1, the flow path of the flue gas of furnace 1 being shown by arrow F. In the recuperator, a radiation heat exchanger 3 and a convective heat exchanger 4 are arranged one behind the other, so to say connected in series. In the central portion of the recuperator, a central heat exchange part 7 is arranged, around the one surface of which the flue is circulated and with its other surface the flow of ingressing air indicated with arrow L is in connection. On the flue gas side of central heat exchange part 7, an auxiliary heat exchange surface 5 is provided forming a mantle of a cylinder around central heat exchange part 7. On the inner side of the recuperator's housing provided with an insulation 14, an outer convective heat exchange part 11 is arranged, which is connected to a collecting chamber 12. The preheated air, the flow of which is indicated with arrow L, leaves the recuperator through connecting piece 13. The outer convective heat exchange part 11 is connected to central heat exchange part 7 through pathes 6.

The recuperator as in this invention operates as follows.

The flue gas coming from the burning area of the industrial furnace 1 delivers one part of its heat content to a dividing wall 9 of outer convective heat exchange part 11 and to the bottom surface of central heat exchange part 7 in the radiation heat exchanger 3 of the recuperator. The heat exchange is performed here mainly by radiation. From here, the flue gas flows into convective heat exchanger 4, wherein the remaining part of its heat content will be given mainly by convection to dividing wall 9 and to a delimiting wall 10 of central heat exchange part 7. The amount of the heat communicated by convection is increased with the help of auxiliary heat exchange surface 5 which is circumfluented and thus heated by the flue gas. The auxiliary heat exchange surface 5 gives its heat by way of radiation to dividing wall 9 and delimiting wall 10.

On the air side of the recuperator, the ingressing flow of air coming through a conduit 8 impacts with high speed (about 80 m/s) on the bottom surface of central heat exchange part 7 and flows in the figure upwards along delimiting wall 10 and through path 6 into convective heat exchange part 11. In the course of its travel, it picks up the heat from the connecting parts. At the end of its flow path, the air is collected in collecting chamber 12 and leaves through connecting piece 13.

The heat wastes of the recuperator are reduced by providing insulation 14 on its housing.

Dividing wall 9 can be made of heat resistant steel, auxiliary heat exchange surface 5 of acid resisting steel, the other parts of the recuperator of steel of boiler plate quality.

The recuperator as in my invention has the following additional advantages. Because of the heat exchange with impacting flows, the endurance of the convective heat exchanger 4 will be longer. Auxiliary heat exchange surface 5 and delimiting wall 10 can be provided with roughening (e.g. with ribs) which increases the effectiveness of the convective heat exchange. As a result of the shape of radiation heat exchanger 3, the recuperator can directly be connected to burners with dish-like flame.

What we claim is:

1. A recuperator for industrial furnaces comprising:
   an outer shell;
   a flue gas flow connecting means on end of said outer shell fluidly connected to a furnace flue gas flow path;
   an air flow passage means located within said outer shell and having an air inlet on one end of said outer shell;

a radiation heat exchanger fluidly connected to said flue gas flow connecting means at one end of said radiation heat exchanger;

a convective heat exchanger located on an end of said radiation heat exchanger remote from said radiation heat exchanger one end and spaced from said flue gas flow connecting means so that said radiation heat exchanger separates said convective heat exchanger from said flue gas flow connecting means to be in series with said radiation heat exchanger and behind said radiation heat exchanger with respect to said flue gas flow connecting means;

said convective heat exchanger including a dividing wall having a first heat transfer surface thereof facing said radiation heat exchanger to be in heat transfer communication with said radiation heat exchanger, said convective heat exchanger further including an air conduit fluidly connected at a first end thereof to said air inlet, said air conduit including a second end located adjacent to and spaced from a second heat transfer surface of said dividing wall and directing air to impact against said dividing wall second heat transfer surface;

said air passage means being continuous and including said air conduit and a convective portion in said convective heat exchanger, said convective portion including a first section fluidly connected to said dividing wall second heat transfer surface to receive air which has impacted said dividing wall second heat transfer surface, a second section fluidly connected to said first section, heat transfer to said air flow passage means convective portion being primarily by means of convection, said convective heat exchanger further including means defining an auxiliary heat exchange surface adjacent to said air passage means convective portion, said air flow passage means further including a radiation portion extending beyond said dividing wall and located in said radiation heat exchanger to transfer heat to air flowing in said air flow passage means radiation portion with heat transfer to said air passage means radiation portion being primarily by means of radiation, said air passage means further including a collecting chamber having a first end thereof fluidly connected to said air passage means radiation portion and an outlet fluidly connected to a second end of said collecting chamber, said collecting chamber first and second ends being positioned so that at least some portion of the air flowing in said collecting chamber moves in a direction different from the flow direction of air in said air passage means radiation portion;

said dividing wall being located with respect to said flue gas flow connecting means so that heat transfer to said dividing wall first heat transfer surface is predominantly by means of radiation and heat transfer from said dividing wall second heat transfer surface is predominantly by means of convection;

said dividing wall defining a heat transfer means which exchanges heat flowing from said radiation heat exchanger to said dividing wall to air flowing in said convective heat exchanger which has impacted said dividing wall.

2. The recuperator defined in claim 1 wherein said auxiliary heat exchange surface (5) is located between said air flow passage means convective portion first and section sections.

* * * * *